US009036155B2

(12) United States Patent
Chen et al.

(10) Patent No.: US 9,036,155 B2
(45) Date of Patent: *May 19, 2015

(54) SIX-AXIS FOUR-SUBDIVIDING INTERFEROMETER

(71) Applicants: Shanghai Institute of Optics And Fine Mechanics, Chinese Academy of Sciences, Shanghai (CN); Shanghai Micro Electronics Equipment Co., Ltd., Shanghai (CN)

(72) Inventors: Jianfang Chen, Shanghai (CN); Zhaogu Cheng, Shanghai (CN); Ya Cheng, Shanghai (CN); Huijie Huang, Shanghai (CN); Feng Chi, Shanghai (CN)

(73) Assignees: Shanghai Institute of Optics And Fine Mechanics, Chinese Academy of Sciences, Shanghai (CN); Shanghai Micro Electronics Equipment Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,991

(22) Filed: Jan. 10, 2014

(65) Prior Publication Data

US 2014/0125989 A1 May 8, 2014

(30) Foreign Application Priority Data

Jul. 22, 2011 (CN) .......................... 2011 1 0206449

(51) Int. Cl.
*G01B 11/02* (2006.01)
*G01B 9/02* (2006.01)

(52) U.S. Cl.
CPC .............. *G01B 9/02* (2013.01); *G01B 9/02007* (2013.01); *G01B 9/02027* (2013.01); *G01B 9/02056* (2013.01); *G01B 2290/70* (2013.01)

(58) Field of Classification Search
CPC ...... G01B 9/02; G01J 9/02; G01J 2009/0261; G01J 4/04; G01N 21/45
USPC ........................................................ 356/491
See application file for complete search history.

(56) References Cited

U.S. PATENT DOCUMENTS 3,529,894 A 9/1970 Hock
4,758,133 A * 7/1988 Clark et al. .................... 417/360

(Continued)

FOREIGN PATENT DOCUMENTS

CN 1510390 A 7/2004
CN 101245984 A 8/2008

(Continued)

OTHER PUBLICATIONS

Cheng, Jishui, "Study on interferometer measurement error model in wafer stage," Chinese Master's Theses full-text database—Engineering science and technology II. May 15, 2010, No. 5, pp. 9-13, ISSN 1674-0246.

(Continued)

*Primary Examiner* — Tarifur Chowdhury
*Assistant Examiner* — Md Rahman
(74) *Attorney, Agent, or Firm* — Manni Li; Mei & Mark LLP

(57) ABSTRACT

Six-axis four-subdividing interferometer comprising a six-axis light splitting system and an interference module which are sequentially arranged along the incident direction of polarization orthogonal double-frequency laser, wherein the six-axis light splitting system comprises five 45-degree plane beam splitters and four 45-degree full-reflecting mirrors.

6 Claims, 2 Drawing Sheets

(56) References Cited

U.S. PATENT DOCUMENTS

| | | | |
|---|---|---|---|
| 4,883,357 A | | 11/1989 | Zanoni et al. |
| 5,404,222 A | * | 4/1995 | Lis ............................... 356/487 |
| 5,537,209 A | * | 7/1996 | Lis ............................... 356/487 |
| 2003/0197869 A1 | | 10/2003 | Johnstone et al. |
| 2006/0087657 A1 | | 4/2006 | Holmes et al. |

FOREIGN PATENT DOCUMENTS

| | | |
|---|---|---|
| CN | 101413783 A | 4/2009 |
| CN | 101907443 A | 12/2010 |
| CN | 102033413 A | 4/2011 |
| TW | 200615505 A | 5/2006 |

OTHER PUBLICATIONS

Deng, Shang, "Subdivision technology of laser interferometer," Tool Engineering, Dec. 31, 2005, No. 7, vol. 39, pp. 94-95, ISSN 1000-7008.

* cited by examiner

SIX-AXIS FOUR-SUBDIVIDING INTERFEROMETER

CROSS-REFERENCE AND RELATED APPLICATIONS

The subject application is a continuation of PCT international application PCT/CN2011/001272 filed on Aug. 2, 2011, which in turn claims priority on Chinese patent application No. CN 201110206449.X filed on Jul. 22, 2011. The contents and subject matter of the PCT and Chinese priority applications are incorporated herein by reference.

TECHNICAL FIELD OF THE INVENTION

The invention relates to a multi-axis interferometer, in particular, a six-axis four-subdividing interferometer.

BACKGROUND OF THE INVENTION

The interferometer is an essential tool for precisely measuring the displacement, length, etc., of the target device. In the interferometer, the change in the length of the optical path is converted into displacement so as to precisely measure the displacement. Since the double-frequency laser has the advantages of being high in resolution, fast in velocity measurement, large in measurement scope and capable of carrying out multi-axis synchronous measurement, it is widely used in the advanced manufacturing and nanotechnology, for example, for positioning and measuring the workpiece stage and the reticle stage of a mask aligner with high precision.

In order to measure the length or displacement, axial rotation and many other degrees of freedom of the target device at the same time, a multi-axis interferometer including a plurality of laser beams can be used, each laser beam being corresponding to a measurement axis of the interferometer. In the multi-axis interferometer, the multi-axis light splitting beams must have equal energy and be parallel to each other. The quality of the design of the light splitting system is the key for the multi-axis splitting interferometer. A good light splitting system enables the interferometer to have a high stability and a consistent temperature drift of the light beams of the light paths.

Although the multi-axis interferometer has already been successfully applied in many fields, currently, the constantly pursuing goal is to continuously improve its performance so as to obtain an excellent measurement accuracy, especially to constantly improve the light splitting system of the multi-axis interferometer so as to obtain a good stability, a low temperature drift, nonlinear errors and adjustability. Therefore, the light splitting system of the multi-axis interferometer must be carefully designed in order to minimize the measurement error caused by the imbalance of the light path, such as thermal drift, nonlinear errors, etc. Currently, the multi-axis interferometer generally uses a block optical light splitting component, which is coated with a plurality of coatings of different requirements on a single surface, for splitting light. This light splitting method has a very high requirement for the optical processing precision, and the same light splitting component should be coated with a plurality of coatings of different requirements (such as anti-reflection, full-reflection, 50% of light splitting film, 33% of light splitting film, etc.) on two light surfaces, which poses much great difficulties for coating film.

In addition, since the light splitting beams of the light paths have different paths in the block optical light splitting component, the temperature drift of the light beams of the light paths is inconsistent, and furthermore the transmission distances of the measuring beam and the reference beam in the medium (such as quartz glass) are different for the structure of the differential interferometer. Since the geometrical position between each light splitting surface and reflecting surface of the block optical light splitting component is fixed, each light splitting beam cannot be adjusted separately. Therefore, such light splitting system has the disadvantages of poor consistence of the temperature drift of the light beams of the light paths, difficulties in the adjustment of the light path, etc., in the application.

SUMMARY OF THE INVENTION

The object of the invention is to overcome the above mentioned deficiencies, and provide a six-axis four-subdividing interferometer. The interferometer has the advantages that the components are easy to process, the light path adjustment is convenient, nonlinear errors are fewer, the temperature drift of the light beams of the light paths is consistent, and the like.

The six-axis four-subdividing interferometer of the invention comprises a six-axis light splitting system and an interference module which are sequentially arranged along the incident direction of polarization orthogonal double-frequency laser.

The six-axis light splitting system comprises five 45-degree plane beam splitters and four 45-degree full-reflecting mirrors, the position relationship being as follows:

a first 45-degree plane beam splitter with 33% of splitting ratio being arranged in the incident direction of polarization orthogonal double-frequency laser, a second 45-degree plane beam splitter and a first 45-degree full-reflecting mirror with 50% of splitting ratio being arranged above the first 45-degree plane beam splitter sequentially, a third 45-degree plane beam splitter, a fourth 45-degree plane beam splitter, and a fifth 45-degree plane beam splitter, all the splitting ratios of which are 50%, being arranged on the same vertical plane sequentially from bottom to top, a second 45-degree full-reflecting mirror, a third 45-degree full-reflecting mirror, and a fourth 45-degree full-reflecting mirror being arranged on another vertical plane parallel to it sequentially from bottom to top;

the first 45-degree plane beam splitter dividing the incident polarization orthogonal double-frequency laser into 33% of transmission beam and 66% of reflection beam, a third 45-degree plane beam splitter being arranged along the direction of the transmission beam and being divided into a transmission beam and a reflection beam with equal energy via the third 45-degree plane beam splitter, in which the reflection beam has a direction of propagation parallel to the transmission beam after being reflected by the second 45-degree full-reflecting mirror so as to form A and B light in the lower layer;

the reflection beam with 66% of energy reflected by the first 45-degree plane beam splitter being divided into a transmission beam and a reflection beam with equal energy via the second 45-degree plane beam splitter with 50% of splitting ratio arranged parallel to the first 45-degree plane beam splitter from top to bottom; in which the reflection beam is incident to the fourth 45-degree plane beam splitter with 50% of splitting ratio, which is divided into a transmission beam and a reflection beam with equal energy, in which the reflection beam has a direction of propagation parallel to the transmission beam after being reflected by the third 45-degree full-reflecting mirror again so as to form C and D light in the middle layer;

the transmission beam via the second 45-degree plane beam splitter also changing its direction of propagation and being parallel to the each of the above splitting beams after being reflected by the first 45-degree full-reflecting mirror arranged parallel to the second 45-degree plane beam splitter from top to bottom; similarly, the beam being incident to the fifth 45-degree plane beam splitter with 50% of splitting ratio again and being divided into a transmission beam and a reflection beam with equal energy via the fifth 45-degree plane beam splitter, in which the reflection beam has a direction of propagation parallel to the transmission beam after being reflected by the fourth 45-degree full-reflecting mirror so as to form E and F light in the upper layer. In this way, a beam of double-frequency laser output from the laser being divided into six beams which have equal energy and are parallel to each other, two beams being in the upper, middle and lower layers, respectively.

The interference module comprises a polarizing beam splitter, a first ¼ wave plate and a measurement reflecting mirror being arranged in the light transmission direction of the polarizing beam splitter, a second ¼ wave plate and a reference reflecting mirror being arranged in the light reflection direction of the polarizing beam splitter, two strip rectangular prisms which are vertically arranged or six rectangular prisms which are arranged in two columns and three layers from down to top being arranged in the fourth direction of the polarizing beam splitter, and the measurement reflecting mirror being fixed on the object to be measured.

The interference module comprises a polarizing beam splitter, a first ¼ wave plate and a measurement reflecting mirror being arranged in the light transmission direction of the polarizing beam splitter, a second ¼ wave plate and an adjustable 45-degree reflecting mirror (adopted in the six-axis four-subdividing differential interferometer) being arranged in the light reflection direction of the polarizing beam splitter, a reference reflecting mirror being arranged in the light reflection direction of the adjustable 45-degree reflecting mirror, two strip rectangular prisms which are vertically arranged or six rectangular prisms which are arranged in two columns and three layers from down to top being arranged in the fourth direction of the polarizing beam splitter, and both the measurement reflecting mirror and the reference reflecting mirror being fixed on the object to be measured.

The six rectangular prisms are arranged as follows from bottom to top: the first layer: a first rectangular prism, a second rectangular prism; the second layer: a third rectangular prism, a fourth rectangular prism; and the third layer: a fifth rectangular prism, and a sixth rectangular prism.

A six-axis light splitting system comprising a series of 45-degree plane beam splitters (33% and 50% of splitting ratio) and 45-degree full-reflecting mirrors is used, which divides the incident light into six parallel beams with equal energy. The six parallel beams are used as the precision measurement of six degrees of freedom. Since this light splitting system is used, compared with the usual block light splitting system, the transmission distance of the six light beams relative to six measurement axes is significantly shortened in the quartz or glass medium, and the six light beams have equal transmission distance in the medium so that the consistence of the temperature drift of the light beams of the light paths is significantly improved and the measurement errors of the measurement axes resulted from the thermal drift can also be efficiently reduced. In addition, since each 45-degree plane beam splitter and 45-degree full-reflecting mirror in the light splitting system can be separately adjusted, the beam corresponding to each measurement axis can also be independently adjusted. The novel six-axis light splitting system of the invention can be applied in all types of multi-axis interferometers, such as six-axis plane mirror interferometers, six-axis differential interferometers, etc.

For the plane mirror interferometer, the reference reflecting mirror is fixed inside the interferometer, and the measurement reflecting mirror is fixed on the object to be measured, such as the workpiece stage of a mask aligner. However, for the differential interferometer, the reference mirror and the measurement mirror are fixed on the object to be measured, respectively, such as the workpiece stage and the objective lens of a mask aligner.

The light source is generally the He—Ne double-frequency laser, outputting two linear polarization beams which are equal in energy and mutually vertical in polarization direction. The two polarization components have a frequency difference of several MHzs and high frequency stability.

A polarization beam splitter divides each of the six parallel beams which have passed through the six-axis light splitting system into measurement beams and reference beams in accordance with the polarization features. The six measurement beams are the beams which have been transmitted by the six beams which have passed through the polarization beam splitter, whereas the six reference beams are the beams which have been reflected by the six beams which have passed through the polarization beam splitter. Similarly, if the components of the interferometer are appropriately rearranged, the measurement beams and the reference beams can be exchanged, without changing the function of the interferometer.

The six measurement beams are transmitted to the measurement reflecting mirror after passing through the common ¼ wave plate, and enter the polarization beam splitter via the ¼ wave plate after being reflected. Since the six measurement beams pass through the ¼ wave plate twice, the polarization direction of the six measurement beams is rotated by 90 degrees so that the six measurement beams which enter the polarization beam splitter again are reflected (rather than transmitted) on the polarization surface of the polarization beam splitter. The reflected six measurement beams enter six rectangular prisms, and then is reflected back to the polarization beam splitter. After being reflected by the polarization beam splitter, the six measurement beams will be reflected in the measurement reflecting mirror again. Hence, after passing through the ¼ wave plate twice, the polarization direction of four measurement beams is rotated by 90 degrees so that four measurement beams which enter the polarization beam splitter again are transmitted and output on the polarization surface of the polarization beam splitter.

The polarization beam splitter also generates six reference beams, which are beams which are reflected by the six incident beams which have passed through the polarization beam splitter. The six reference beams are incident on the reference reflecting mirror after passing through the common ¼ wave plate, and enter the common polarization beam splitter via the ¼ wave plate after being reflected by it again. The polarization surface is rotated by 90 degrees. After be transmitted by the polarization beam splitter and being refracted by the rectangular prism, the six reference beams will repeat the above processes via the common polarization beam splitter, the ¼ wave plate and the reference reflecting mirror. The reference beam, whose polarization direction has been rotated by 90 degrees again, will be reflected and output when reaching the 45-degree polarization surface of the polarization beam splitter.

Subsequently, the six reference beams and the six measurement beams are combined with each other, respectively, so as to form six output beams 21-26. Each outgoing beam includes a reference beam and a measurement beam transmitted collinearly, correspondingly to a measurement optical axis. The output beam is detected by a detector and is processed by the computer software. By analyzing the beat frequency signal between the reference beam and the measurement beam in each outgoing beam, the Doppler shift information of the moving object in the beat frequency signal is solved so as to obtain the moving object information of six degrees of freedom.

Compared with the prior art, the invention has the following technical features:

1. The six-axis light splitting system comprises five 45-degree plane beam splitters and four 45-degree full-reflecting mirrors. A beam splitter with 33% of splitting ratio divides the incident polarization laser into two beams, in which a transmission beam with 33% of splitting ratio is incident on a 45-degree plane beam splitter with 50% of splitting ratio and is divided into a transmission beam and a reflection beam with equal energy via the beam splitter, and in which the reflection light passes through a 45-degree full-reflecting mirror again so that the above reflection light is parallel to the transmission light; however, the reflection beam with 66% of energy reflected after passing through the first plane beam splitter with 33% of splitting ratio is divided into a transmission beam and a reflection beam with equal energy after passing through a 45-degree plane beam splitter with 50% of splitting ratio arranged on the same vertical line in parallel thereto; similarly, the reflection beam is divided into a transmission beam and a reflection beam with equal energy via a beam splitter with 50% of splitting ratio, and the reflection beam is transmitted in parallel to the transmission light after passing through a 45-degree full-reflecting mirror again; the transmission beam passing through the plane beam splitter with 50% of splitting ratio on the same vertical line as the plane beam splitter with 33% of splitting ratio also changes its direction of propagation after passing through a 45-degree full-reflecting mirror arranged on the same vertical line in parallel thereto and is parallel to the above splitting beams; similarly, the beam is also divided into a transmission beam and a reflection beam with equal energy after passing through a 45-degree plane beam splitter with 50% of splitting ratio, in which the reflection beam is transmitted in parallel to the transmission beam after passing through a 45-degree full-reflecting mirror again. In this way, a beam of double-frequency laser output from the laser is finally divided into six beams which have equal energy and are parallel to each other after passing through the six-axis light splitting system, and they provide precision measurement of six degrees of freedom as the light source of the six axes of the interferometer.

2. As the entire light splitting system uses the combination of the plane beam splitter and the reflecting mirror, compared with the usually adopted block optical light splitting component coated with a plurality of coatings with different requirements on a single surface, it has the advantages that the components are easy to process, the light path adjustment is easy, etc.

3. Similarly, the entire light splitting module only uses the combination of the plane beam splitter and the reflecting mirror, and can ensure that each light splitting path has the same path in the light splitting component, so compared with the usually adopted block optical light splitting component system, it has the advantages that the temperature drift is small and the temperature drift of the light beams of the light paths is consistent, and the like.

4. The novel six-axis light splitting system of the invention can be applied in all types of multi-axis interferometers, such as six-axis plane mirror interferometers, six-axis differential interferometers, etc. In the six-axis plane mirror interferometer, the reference reflecting mirror and the measurement reflecting mirror are arranged in the geometrical configuration vertical to each other, and in this way, the six reference beams will be directly irradiated on the reference reflecting mirror with fixed position after passing through the common polarization beam splitter and the ¼ wave plate; in the six-axis differential interferometer, the six reference beams should be refracted by a 45-degree reflecting mirror, making the beam, which has been changed in the direction of propagation by 90 degrees after passing through the common polarization beam splitter and the ¼ wave plate, incident on the reference reflecting mirror arranged in parallel to the measurement reflecting mirror. The structure ensures that the measurement beam and the reference beam have the same path in the optical components, and have the advantages that the temperature drift is small and the nonlinear errors are fewer, etc. Meanwhile, since the 45-degree reflecting mirror can be independently adjusted, it also has the advantages that the components are easy to process, the light path adjustment is easy, and the like.

The invention has the advantages that the components are easy to process, the light path adjustment is convenient, nonlinear errors are fewer, the temperature drift of the light beams of the light paths is consistent, and the like.

DETAILED DESCRIPTION OF THE INVENTION

The invention is further explained in combination with the embodiments and the accompanying diagrams, but the protection scope of the invention should not be limited by it.

Figure 1:
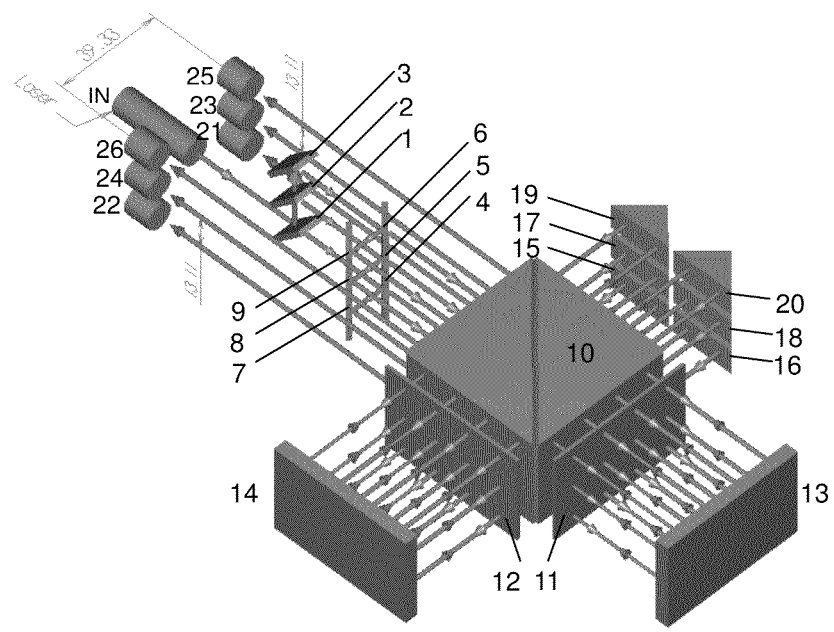
FIG. 1 shows a schematic diagram of the three-dimensional light path of the six-axis four-subdividing plane mirror interferometer of an embodiment of the invention.
Figure 2:
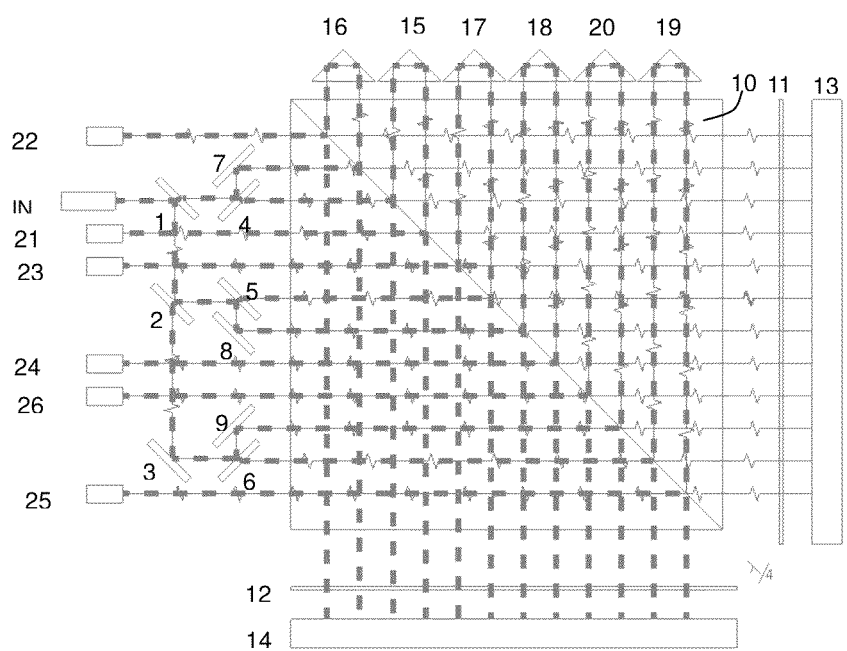
FIG. 2 shows a schematic diagram of the planar light path of the six-axis four-subdividing plane mirror interferometer comprising five beam splitters and four reflecting mirrors.

First, refer to FIG. 1, which shows a schematic diagram of the three-dimensional light path of the six-axis four-subdividing plane mirror interferometer of an embodiment of the invention, and also shows a structural schematic diagram of the most preferred embodiments of the invention. The six-axis four-subdividing plane mirror interferometer comprises a six-axis light splitting system including five 45-degree plane beam splitters and four 45-degree full-reflecting mirrors, a polarizing beam splitter 10, a first ¼ wave plate 11 and a second ¼ wave plate 12, a measurement reflecting mirror 13, a reference reflecting mirror 14, and six rectangular prisms 15, 16, 17, 18, 19, 20. It can be seen from the diagrams that in the embodiment, the polarization orthogonal double-frequency laser beam IN with two mutually vertical lines output by the double-frequency He—Ne laser is divided into six parallel beams with equal energy after passing through the six-axis light splitting system. In the light splitting system, a first 45-degree plane beam splitter 1 with 33% of splitting ratio first divides the incident polarization orthogonal double-frequency laser IN into two beams, in which the transmission beam with 33% of splitting ratio is incident on a third 45-degree plane beam splitter 4 with 50% of splitting ratio, and is divided into a transmission beam (beam A in the lower layer) and a reflecting beam with equal energy via the third 45-degree plane beam splitter 4, and in which the reflecting light passes through a 45-degree full-reflecting mirror 7 again so that the direction of propagation is parallel to the transmission beam (beam B in the lower layer); however, the reflection beam with 66% of energy reflected after passing through the first plane beam splitter 1 with 33% of splitting ratio is divided into a transmission beam and a reflection beam with equal energy after passing through a 45-degree plane beam splitter 2 with 50% of splitting ratio arranged on the same vertical line in parallel to its central point; similarly, the reflection beam is incident on a fourth 45-degree plane beam splitter 5 with 50% of splitting ratio, and is divided into a transmission beam (beam C in the middle layer) and a reflection beam with equal energy via the fourth 45-degree plane beam splitter 5, and the reflection beam enables the direction of propagation to be parallel to the transmission beam (beam D in the middle layer) after passing through a third 45-degree full-reflecting mirror 8 again; the transmission beam passing through the second plane beam splitter 2 with 50% of splitting ratio also changes its direction of propagation after passing through a first 45-degree full-reflecting mirror 3 arranged on the same vertical line in parallel thereto and is parallel to the above splitting beams; similarly, the beam is also incident on a fifth 45-degree plane beam splitter 6 with 50% of splitting ratio, and is divided into a transmission beam (beam E in the upper layer) and a reflection beam with equal energy after passing through the fifth 45-degree plane beam splitter 6, in which the reflection beam enables the direction of propagation to be parallel to the transmission beam (beam F in the upper layer) after passing through a fourth 45-degree full-reflecting mirror 9 again; in the light path of the beam splitter, a third 45-degree plane beam splitter 4, a fourth 45-degree plane beam splitter 5, and a fifth 45-degree plane beam splitter 6, all the splitting ratios of which are 50%, are arranged on the same vertical plane, and a second 45-degree full-reflecting mirror 7, a third 45-degree full-reflecting mirror 8, and a fourth 45-degree full-reflecting mirror 9 are arranged on another vertical plane parallel to it. In this way, the double-frequency laser output from the laser is divided into six beams which have equal energy, maintain unchanged horizontal polarization and vertical polarization (depolarization) and are parallel to each other after passing through the six-axis light splitting system, and they are used in the measurement of six degrees of freedom the six-axis interferometer. The distance between the six beams is generally from 10 to 25 cm. The variation of the six degrees of freedom can be calculated by detecting the displacement of the six axes.

Subsequently, a polarization beam splitter 10 divides each of beams into measurement beams and reference beams in accordance with different polarization features. The six measurement beams are the beams which have been transmitted by four beams which have passed through the polarization beam splitter 10, whereas the six reference beams are the beams which have been reflected by the four beams which have passed through the polarization beam splitter 10. Each of the measurement beams is reflected by the measurement mirror 13 after passing through the common ¼ wave plate 11. The reflected beam passes through a first ¼ wave plate 11 again. The polarization direction of the measurement beams passing through the first ¼ wave plate 11 twice is rotated by 90 degrees so that the measurement beam is reflected (rather than transmitted) on the light splitting interface of the polarization beam splitter 10 and transmitted by the beams of six rectangular prisms 15, 16, 17, 18, 19 and 20 so as to achieve the goal of repeating the path four times in the measurement distance by the measurement beam (so does the reference beam) and realizing four-subdivision. The six measurement beams reflected by the light splitting interface of the polarization beam splitter 10 enter the six rectangular prisms 15, 16, 17, 18, 19 and 20, respectively, and are reflected back to the polarization beam splitter 10 by the six rectangular prisms. After being reflected by the polarization beam splitter 10, the six measurement beams will be reflected by the measurement reflecting mirror 13 again. Hence, after passing through the ¼ wave plate 11 twice, the polarization direction of the measurement beams is rotated by 90 degrees again so that the measurement beams are transmitted on the polarization beam splitter 10 so as to finally achieve the goal of repeating the path of four times in the measurement distance and realizing four-subdivision. The above six reference beams that have the similar beam propagation process and have changed the polarization direction twice are combined respectively, forming six beat frequency output beams 21, 22, 23, 24, 25, 26 associated with a certain measurement axis. The beat frequency beam with the Doppler shift information of the moving object enters a photoelectric receiver after passing through a polarization analyzer which forms a 45-degree axis with the horizontal polarization and the vertical polarization, and is detected by a detector and processed by the computer software so as to obtain the information of the amount of movement of the object to be measured, thereby providing the precise measurement of six degrees of freedom. Compared with the generally block optical component light splitting method, the six beams corresponding to six measurement axes have the short and equal path in the light splitting component, and the measurement errors resulted from the temperature drift can be reduced. In addition, since each optical component can be separately adjusted, the beam corresponding to each measurement axis can also be independently adjusted so that it is more convenient to adjust the interferometer.

The light splitting principle of the invention can be also applied to the six-axis four-subdividing differential interferometer, which is another embodiment of the invention. The difference from the above embodiment (referring to FIG. 1) is that the six reference beams are not directly incident to the reference reflecting mirror 14 after passing through the common polarization beam splitter 10 and the ¼ wave plate 12, but are refracted by a 45-degree reflecting mirror, change the direction of propagation of the reference beam by 90 degrees so that the reference beam is parallel to the measurement beam, and are incident on the reference reflecting mirror arranged in parallel to the measurement reflecting mirror. The structure ensures that the measurement beam and the reference beam have the same path in the optical components, and have the advantages that the temperature drift is small and the nonlinear errors are fewer, etc. Meanwhile, since the 45-degree reflecting mirror can be independently adjusted, it also has the advantages that the components are easy to process, the light path adjustment is easy, and the like.

We claim:
1. A six-axis four-subdividing interferometer comprising a six-axis light splitting system, and an interference module,
wherein the six-axis light splitting system and the interference module are sequentially arranged along an incident direction of a polarization orthogonal double-frequency laser;
the six-axis light splitting system comprises a first splitter having a splitting ratio of 33%, a second splitter having a splitting ratio of 50%, a third splitter having a splitting ratio of 50%, a fourth splitter having a splitting ratio of 50%, and a fifth splitter having a splitting ratio of 50%, all of said splitters being 45-degree plane beam splitters, and a first, a second, a third, and a fourth mirrors, said mirrors being 45-degree full-reflecting mirrors;

the first splitter divides the incident polarization orthogonal double-frequency laser into a transmission beam and a reflection beam;

the second splitter and the first mirror are sequentially arranged above the first splitter to receive and divide the reflection beam from the first splitter;

the third splitter, the fourth splitter, and the fifth splitter are sequentially arranged from bottom to top on a first vertical plane to receive and divide the transmission beam from the first splitter; and the second mirror, the third mirror, and the fourth mirror are sequentially arranged from bottom to top on a second vertical plane to respectively reflect and change direction of refection beams from the third splitter, the fourth splitter, and the fifth splitter, the second vertical plane being in parallel to the first vertical plane.

2. The six-axis four-subdividing interferometer according to claim 1, wherein the first splitter is arranged in the incident direction of the polarization orthogonal double-frequency laser to divide the incident polarization orthogonal double-frequency laser into 33% of a first transmission beam and 66% of a first reflection beam, the third splitter is arranged along a direction of the first transmission beam and divides the first transmission beam into a second transmission beam and a second reflection beam with equal energy, the second mirror is arranged in a direction of the second reflection beam to reflect and change a direction of propagation of the second reflection beam to be in parallel to the second transmission beam, thus, forming a first light beam and a second light beam in a lower layer, the second splitter is arranged above the first splitter and in parallel to the first splitter to divide the first reflection beam into a third transmission beam and a third reflection beam with equal energy, the fourth splitter is arranged in an incident direction of the third reflection beam to divide the third reflection beam into a fourth transmission beam and a fourth reflection beam with equal energy, the third mirror is arranged in a direction of the fourth reflection beam to reflect and change a direction of propagation of the fourth reflection beam to be in parallel to the fourth transmission beam, thus, forming a third light beam and a fourth light beam in a middle layer, the first mirror is arranged above the second splitter and in parallel to the second splitter to reflect and change a direction of propagation of the third transmission beam to be in parallel to each of the first, second, third, and fourth light beams, the fifth splitter is arranged in an incident direction of the third transmission beam to divide the third transmission beam into a fifth transmission beam and a fifth reflection beam with equal energy, and the fourth mirror is arranged in a direction of the fifth reflection beam to reflect and change a direction of propagation of the fifth reflection beam to be in parallel to the fifth transmission beam, thus, forming a fifth light beam and a sixth light beam in an upper layer.

3. The six-axis four-subdividing interferometer according to claim 1, wherein the interference module comprises
a polarizing beam splitter,
a first ¼ wave plate being arranged in a light transmission direction of the polarizing beam splitter,
a measurement reflecting mirror being arranged in the light transmission direction of the polarizing beam splitter and being fixed on an object to be measured,
a second ¼ wave plate being arranged in the light reflection direction of the polarizing beam splitter,
a reference reflecting mirror being arranged in the light reflection direction of the polarizing beam splitter, and
two vertically arranged rectangular strip prisms or six rectangular prisms which are arranged in two columns and three layers from down to top, said prisms being arranged in a fourth direction of the polarizing beam splitter.

4. The six-axis four-subdividing interferometer according to claim 1, wherein the interference module comprises
a polarizing beam splitter,
a first ¼ wave plate being arranged in a light transmission direction of the polarizing beam splitter,
a measurement reflecting mirror being arranged in the light transmission direction of the polarizing beam splitter and being fixed on an object to be measured,
a second ¼ wave plate being arranged in the light reflection direction of the polarizing beam splitter,
one of the 45-degree full-reflecting mirror from the six-axis light splitting system, said mirror being adjustable and arranged in the light reflection direction of the polarizing beam splitter,
a reference reflecting mirror being arranged in the light reflection direction of the adjustable 45-degree reflecting mirror and being fixed on the object to be measured,
two vertically arranged rectangular strip prisms or six rectangular prisms which are arranged in two columns and three layers from down to top, said prisms being arranged in a fourth direction of the polarizing beam splitter.

5. The six-axis four-subdividing interferometer according to claim 3, wherein the six rectangular prisms are arranged from bottom to top such that a first rectangular prism and a second rectangular prism are in a first layer, a third rectangular prism and a fourth rectangular prism are in a second layer, and a fifth rectangular prism and a sixth rectangular prism are in a third layer.

6. The six-axis four-subdividing interferometer according to claim 4, wherein the six rectangular prisms are arranged from bottom to top such that a first rectangular prism and a second rectangular prism are in a first layer, a third rectangular prism and a fourth rectangular prism are in a second layer, and a fifth rectangular prism and a sixth rectangular prism are in a third layer.

* * * * *